United States Patent
Yamazaki

(10) Patent No.: US 10,162,631 B2
(45) Date of Patent: Dec. 25, 2018

(54) MICRO CONTROLLER UNIT

(71) Applicant: SANKEN ELECTRIC CO., LTD., Niiza-shi, Saitama (JP)

(72) Inventor: Takanaga Yamazaki, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 281 days.

(21) Appl. No.: 15/336,795

(22) Filed: Oct. 28, 2016

(65) Prior Publication Data

US 2018/0120791 A1  May 3, 2018

(51) Int. Cl.
  *G06F 9/00*  (2006.01)
(52) U.S. Cl.
  CPC ..................................... *G06F 9/00* (2013.01)
(58) Field of Classification Search
  USPC .......................................................... 700/23
  See application file for complete search history.

(56) References Cited

U.S. PATENT DOCUMENTS

| 6,639,843 B2* | 10/2003 | Miyauchi | G11C 16/08 365/185.11 |
| 7,676,651 B2* | 3/2010 | Yamada | G06F 9/30145 712/205 |
| 7,907,473 B2* | 3/2011 | Ishizaki | G11C 7/1006 365/222 |
| 9,251,084 B2* | 2/2016 | Kiyota | G06F 12/0875 |

FOREIGN PATENT DOCUMENTS

JP  H09-091139  4/1997

* cited by examiner

*Primary Examiner* — Fernando Hidalgo
(74) *Attorney, Agent, or Firm* — Banner & Witcoff, Ltd.

(57) ABSTRACT

A micro controller unit includes an arithmetic processing unit that executes an arithmetic processing; a peripheral circuit unit that outputs an event signal, which is a trigger for start of the arithmetic processing, based on an operation state; and a data access control unit. When an instruction to access the data designated by the first address is received from the arithmetic processing unit, the data access control unit selectively executes, depending on the event signal input from the peripheral circuit unit: a processing of instructing the data storage unit to access data designated by a first address indicating a storage location of the data on the data storage unit; and a processing of processing of converting the first address and instructing the data storage unit to access data designated by a second address, which is associated with the first address and is different from the first address.

7 Claims, 7 Drawing Sheets

MICRO CONTROLLER UNIT

TECHNICAL FIELD

This disclosure relates to a micro controller unit for controlling a power conversion device.

BACKGROUND

In micro controller units (MCUs) suitable for power conversion applications in which a real-time property is important, such as control of digital power supplies or automobile motors handles various events. For example, conversion ending events are output from analog/digital (A/D) converters, inversion detection events are output from comparators, timing events are output from pulse width modulation (PWM) timers, and arithmetic ending events are output from digital signal processors (DSPs), then control contents are changed according to such events.

JP-A-H09-91139 discloses a technology for correcting an error of a read-only memory (ROM).

SUMMARY

The control content is changed in response to that a processor of MCUs changes various control parameters (values of program counters, values of condition flags, values of timers, content of data storing registers, and the like) used for control.

As methods of changing control parameters, there are methods of rewriting control parameters on memories through interrupt processing or direct memory access (DMA) transmission. In the methods, however, it takes some time to rewrite the control parameters.

A configuration in which a processor is operated by a program designating a read destination of a control parameter for each control content can also be considered. However, because of an increase in the capacity of a program, this configuration is not suitable for an MCU in which there is a limitation of the capacity of a memory storing a program.

The present disclosure is to provide a micro controller unit capable of changing content of power conversion control at a high speed according to an operation situation or an operation state without increasing the capacity of a program.

According to this disclosure, a micro controller unit capable of controlling a power conversion device includes: an arithmetic processing unit that executes an arithmetic processing based on a program; a data storage unit that stores data used in the arithmetic processing; a peripheral circuit unit that outputs an event signal, which is a trigger for start of the arithmetic processing by the arithmetic processing unit, based on an operation state; and a data access control unit, wherein, when an instruction to access the data designated by the first address is received from the arithmetic processing unit, the data access control unit selectively executes, depending on the event signal input from the peripheral circuit unit: a processing of instructing the data storage unit to access data designated by a first address indicating a storage location of the data on the data storage unit; and a processing of processing of converting the first address and instructing the data storage unit to access data designated by a second address, which is associated with the first address and is different from the first address.

The micro controller unit according to the present disclosure is capable of changing contents of power conversion control at a high speed according to an operation situation or an operation state without increasing the capacity of a program.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

Hereinafter, embodiments of this disclosure will be described with reference to the drawings.

Figure 1:
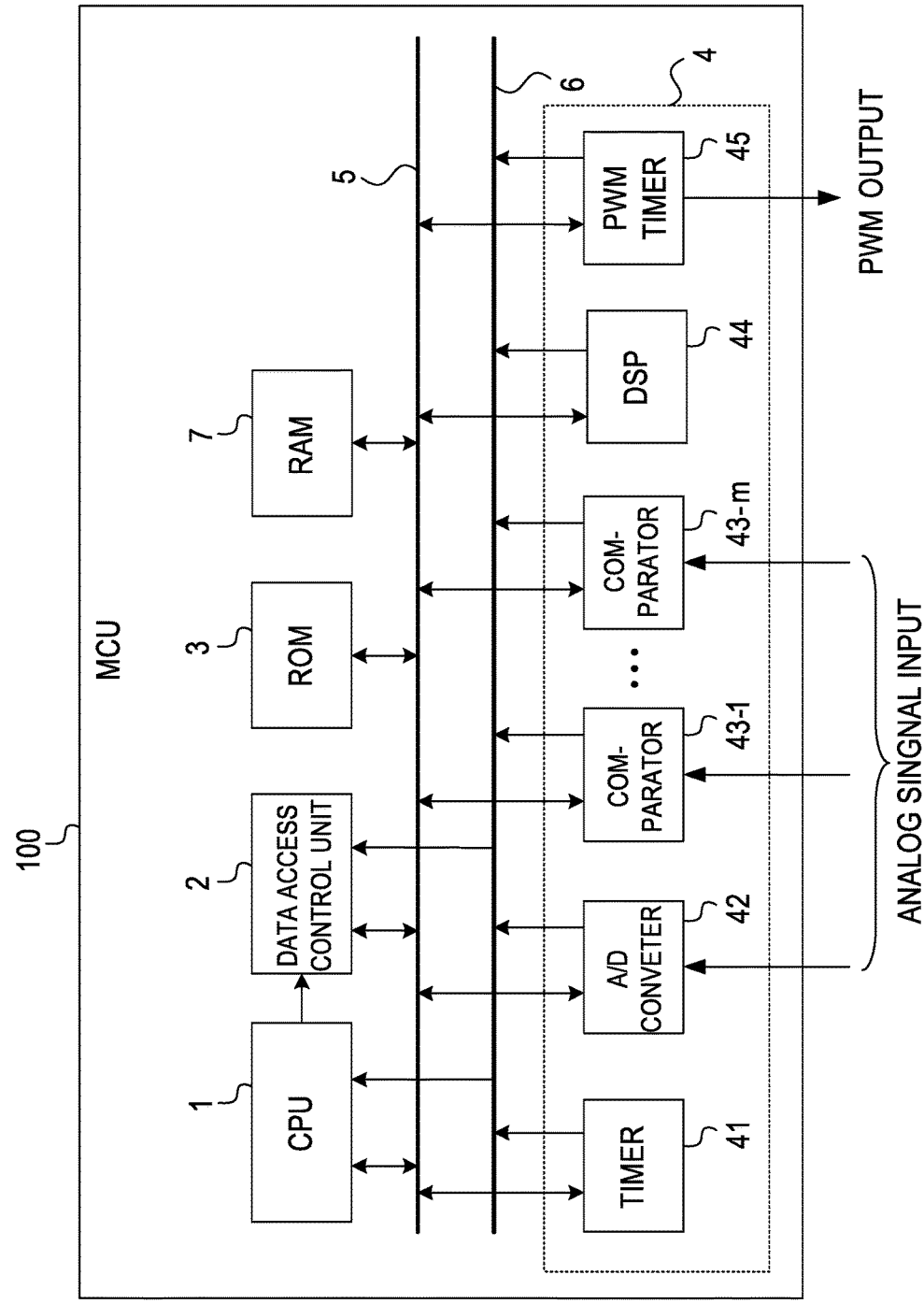
FIG. 1 is a schematic diagram illustrating a schematic configuration of an MCU 100 according to a first embodiment of this disclosure.

FIG. 1 is a schematic diagram illustrating a schematic configuration of an MCU 100 according to a first embodiment of this disclosure.

The MCU 100 is mounted on a switching power device serving as a power conversion device that converts a first direct-current voltage into a second direct-current voltage by turning on and off a switching element such as an MOSFET and outputs the second direct-current voltage. The MCU 100 controls a switching operation of the switching element.

The MCU 100 includes a CPU 1, a data access control unit 2, a ROM 3 functioning as a data storage unit, a peripheral circuit unit 4, and a RAM 7 functioning as a work memory of the CPU 1.

The CPU 1, the data access control unit 2, the ROM 3, the peripheral circuit unit 4, and the RAM 7 are connected to each other via a data bus 5.

The peripheral circuit unit 4 includes a timer 41, an A/D converter 42, m comparators (where m is an integer equal to or greater than 2) 43-1 to 43-$m$, a DSP 44, and a PWM timer 45, and all of which form peripheral circuits. The peripheral circuits included in the MCU 100 are examples and are not limited to the peripheral circuits illustrated in FIG. 1. The MCU 100 includes the plurality of peripheral circuits.

The timer 41 outputs an event signal to an event bus 6 when a count value becomes a pre-decided value.

An analog signal is input from an analog circuit or the like included in the switching power device to the A/D converter 42. Then, the A/D converter 42 converts the analog signal into a digital signal and outputs the digital signal to the data bus 5.

The A/D converter 42 outputs an event signal to the event bus 6 when the conversion of the analog signal into the digital signal ends.

Analog signals are input from an analog circuit or the like included in the switching power device to the comparators 43-1 to 43-*m*. Then, the comparators 43-1 to 43-*m* compare these analog signals to analog signals obtained by receiving digital signals via the data bus 5 and converting the digital signals.

For example, when two analog signals are identical to each other, two analog signals are not identical to each other, or a difference between two analog signals is equal to or greater than a threshold, the comparators 43-1 to 43-*m* outputs event signals to the event bus 6.

The MCU 100 is assumed to include m comparators, but the number of comparators is not limited thereto. For example, one comparator may be included.

The DSP 44 is configured as a processor that executes a program stored in the ROM 3.

The DSP 44 executes, for example, an arithmetic processing using a digital signal output from the A/D converter 42 and generates information for deciding a switching frequency, an ON-width, or the like of the switching element. When the DSP 44 ends the arithmetic processing, the DSP 44 outputs an event signal to the event bus 6.

The PWM timer 45 generates a control signal for driving the switching element based on the information generated by the DSP 44 and outputs the control signal to the outside of the MCU 100. The switching element of the switching power device is driven based on the control signal. In synchronization with a timing where the control signal driving the switching element is changed or a time internally set in the PWM timer 45, the PWM timer 45 outputs an event signal to the event bus 6.

In this way, each peripheral circuit included in the peripheral circuit unit 4 outputs an event signal according to an operation state.

The CPU 1 is configured as a chip that includes a processor functioning as an arithmetic processing unit. The processor executes various arithmetic processings necessary for power control based on programs. An event signal output to the event bus 6 is input to the CPU 1.

The ROM 3 stores programs (arithmetic processing sequences) used for the CPU 1 to execute arithmetic processings and various kinds of data (hereinafter referred to as control data) to be referred by the programs.

The CPU 1 executes an arithmetic processing by loading and executing a program stored in the ROM 3 on the RAM 7 and reads the control data necessary for the arithmetic processing from the ROM 3 to use the control data.

An address indicting a storage location is allocated to the control data stored in the ROM 3. The CPU 1 can read arbitrary control data by designating the address.

The ROM 3 stores a plurality of programs. The CPU 1 executes a necessary program among the programs loaded on the RAM according to the kinds of event signals input from the event bus 6.

In this way, the event signals output from the peripheral circuits are triggered for start of the arithmetic processings by the CPU 1.

When there is a program that executes an arithmetic processing using control data A and there is a program that executes an arithmetic processing using control data B, only the pieces of control data used in the arithmetic processings are different in the two programs.

The ROM 3 does not store all of the plurality of programs in which only the pieces of control data to be used are different, but stores only one of the plurality of programs as a common program. Thus, the capacity of the ROM 3 is reduced.

The event signals output to the event bus 6 are input to the data access control unit 2.

When the CPU 1 instructs the data access control unit 2 to read control data designated by a first address from the ROM 3, the data access control unit 2 selectively executes a processing of instructing the ROM 3 to access the control data designated by the first address and a processing of instructing the ROM 3 to access control data designated by a second address associated with the first address and different from the first address based on the event signals input from the peripheral circuits of the peripheral circuit unit 4. Hereinafter, an example where the data access control unit 2 performs reading of the data will be described. However, the data access control unit 2 can performs writing of the data.

Figure 2:
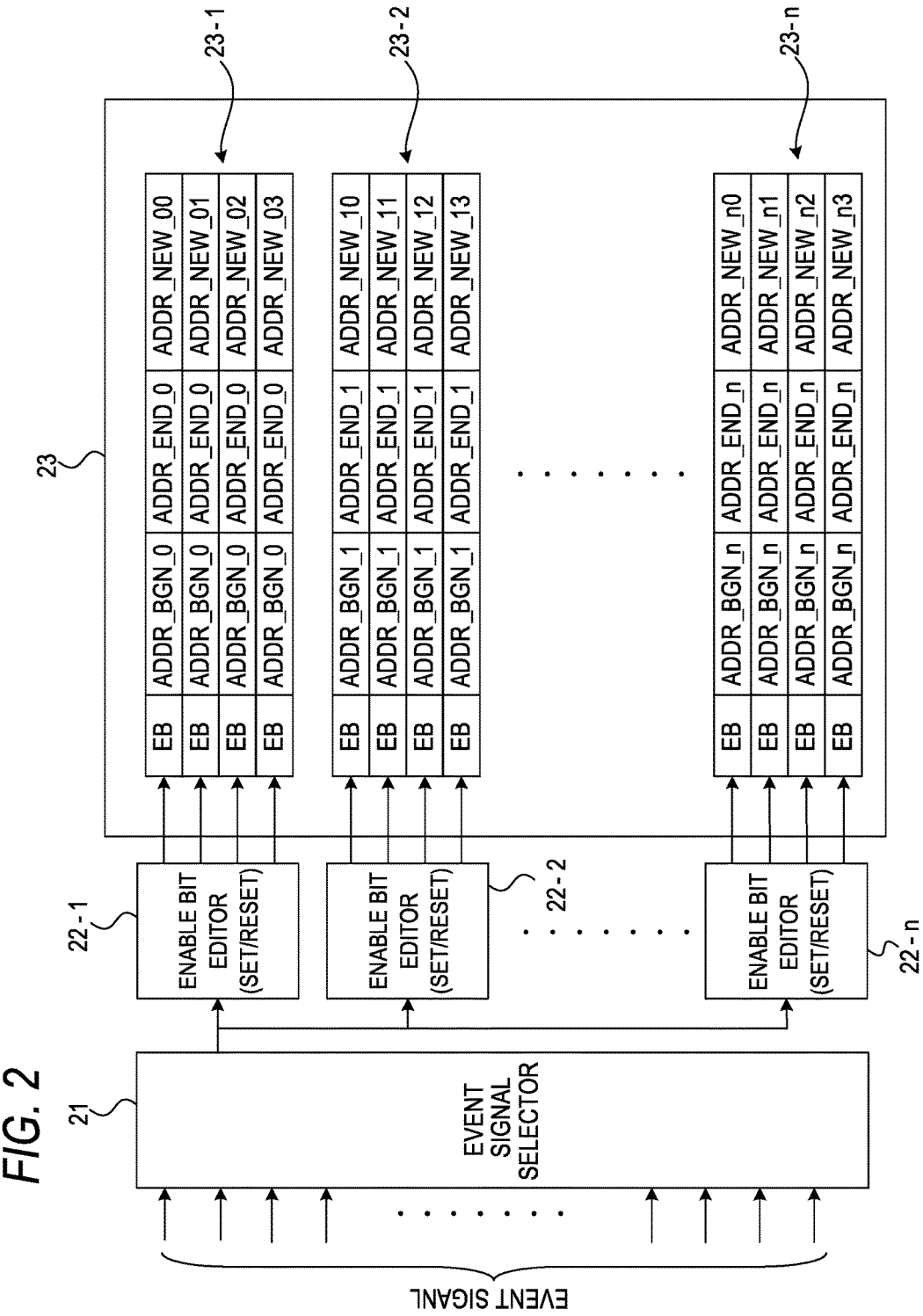
FIG. 2 is a schematic diagram illustrating an internal configuration of a data access control unit 2 of the MCU 100 illustrated in FIG. 1.

FIG. 2 is a schematic diagram illustrating an internal configuration of the data access control unit 2 of the MCU 100 illustrated in FIG. 1.

The data access control unit 2 includes an event signal selector 21, n enable bit editors 22-1 to 22-*n* (where n is an integer equal to or greater than 2), and a transmission unit 23.

The event signals output from the peripheral circuits are input to the event signal selector 21. The event signal selector 21 selects the event signals, which is necessary to change arithmetic processing sequences of the CPU 1 among the input event signals, and inputs the selected event signals to the respective enable bit editors 22-1 to 22-*n*.

The transmission unit 23 stores at least one data set (in the example of FIG. 2, (4×n) data sets) in which the enable bit, range information indicating an arbitrary range of the address of the control data on the ROM 3, and converted address which is a specific address out of the arbitrary range are associated with each other.

The transmission unit 23 is configured to include a register or a memory such as a ROM storing the data set.

The enable bit included in the data set is denoted by "EB" in FIG. 2. The enable bit can be written as one of information indicating "validity" and information indicating "invalidity."

The range information included in the data set is denoted by a combination of "ADDR_BGN_" and "ADDR_END_" (where the sign ** corresponds to 0 to n) in FIG. 2.

"ADDR_BGN_" included in each data set indicates a start address of a predetermined range of a storage region of the control data of the ROM 3, and "ADDR_END_" indicates an end address of the predetermined range. The sign "**" is given for convenience to distinguish information and does not mean an address itself.

A total data amount of control data in a range indicated by the range information included in each data set is, for example, approximately 1-digit byte equal to or greater than 2 bytes and equal to or less than 4 bytes.

The converted address included in the data set is denoted by "ADDR_NEW_@@" (where sign @@ corresponds to 00 to 03, 10 to 13, and n0 to n3) in FIG. 2. The sign "@@" is given for convenience to distinguish information and does not mean an address it self.

The transmission unit 23 stores n groups 23-1 to 23-*n* which respectively include four data sets.

In the four data sets included in each group, the range information is the same and the converted address is different. The range information of the data set included in each of the groups 23-1 to 23-*n* is set in a range which does not overlap.

The enable bit editors 22-1 to 22-n are installed to correspond to the groups 23-1 to 23-n, respectively. That is, the enable bit editor 22-1 corresponds to the group 23-1, the enable bit editor 22-2 corresponds to the group 23-2, . . . , and the enable bit editor 22-n corresponds to the group 23-n.

Each of the enable bit editors 22-1 to 22-n sets the enable bits (writes valid information) or resets (writes invalid information) included in four data sets of the corresponding group based on the event signals input from the event signal selector 21.

In the enable bit editors 22-1 to 22-n, it is possible to arbitrarily set information indicating the data set, in which the enable bits are set or reset, in response to input a certain event signal.

In a state where an instruction to read the control data designated by the first address is received from the CPU 1, if there is a data set in which the enable bits are set to be valid (hereinafter also referred to as valid data bits) and the first address is included in the range designated by the range information included in the valid data set, the transmission unit 23 outputs the converted address (the second address) included in the valid data set to the ROM 3 and executes a processing of instructing the ROM 3 to read data designated by the converted address.

In a state where the instruction to read the control data designated by the first address is received from the CPU 1, if there is no valid data set, the transmission unit 23 outputs the first address to the ROM 3 without converting and executes a processing of instructing the ROM 3 to read data designated by the first address.

In a state where the instruction to read the control data designated by the first address is received from the CPU 1, if there is a valid data set and the first address is not included in the range designated by the range information included in the valid data set, the transmission unit 23 outputs the first address to the ROM 3 without converting and executes a processing of instructing the ROM 3 to read data designated by the first address.

In the data access control unit 2, a function other than a storage element storing the data set may be realized by either hardware or software.

Figure 3:
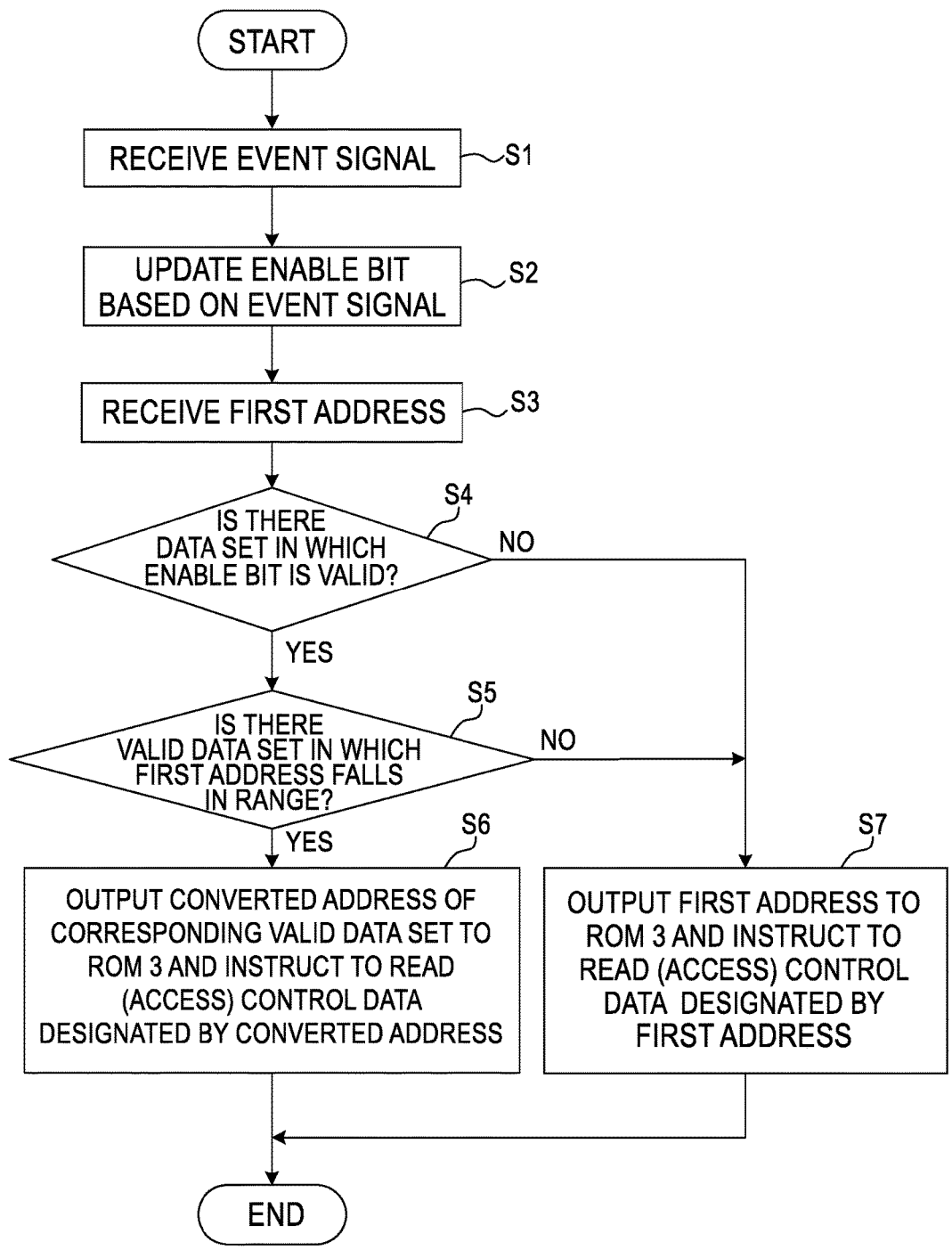
FIG. 3 is a flowchart illustrating an operation of the data access control unit 2 of the MCU 100 illustrated in FIG. 1.

FIG. 3 is a flowchart illustrating an operation of the data access control unit 2 of the MCU 100 illustrated in FIG. 1.

When an event signal is output from the peripheral circuit in the MCU 100, the event signal is input to the CPU 1 and the data access control unit 2.

When the CPU 1 receives the event signal, in order to start executing this arithmetic processing sequence, the CPU 1 transmits the first address of the control data used in another arithmetic processing sequence to the data access control unit 2.

When the data access control unit 2 receives the event signal (step S1), the data access control unit 2 sets the enable bit in the necessary data set among all of the data sets based on the event signal and maintains the enable bit in a reset state in the other data sets (step S2).

After step S2, the data access control unit 2 receives the first address from the CPU 1 (step S3) and determines whether there is the valid data set in which the enable bit is valid (step S4).

When there is the valid data set (YES in step S4), the data access control unit 2 compares the range designated by the range information included in the valid data set to the first address received in step S3 and determines whether there is the valid data set in which the first address falls in the range (step S5).

When there is the valid data set in which the first address falls in the range designated by the range information (YES in step S5), the data access control unit 2 transmits the converted address included in the valid data set to the ROM 3 and instructs the ROM 3 to read the control data designated by the converted address (step S6).

When there are the plurality of valid data sets in which the first address falls in the range designated by the range information, the data access control unit 2 determines priority decided in advance for the plurality of valid data sets and executes the processing of step S6 in sequence from the valid data set with higher priority.

According to the processing of step S6, the CPU 1 can read the control data present at the second address while executing the processing of designating the first address, and thus can execute the arithmetic processing using the control data.

When there is no valid data set (NO in step S4) or when there is the valid data set but there is no valid data set in which the first address falls in the range designated by the range information (NO in step S5), the data access control unit 2 transmits the first address received from the CPU 1 to the ROM 3 without converting and instructs the ROM 3 to read the control data designated by the first address (step S7).

As described above, in the MCU 100, the CPU 1 can refer to another control data in accordance with an occurrence situation of the event signal without converting the address of the ROM 3 designated by the CPU 1. According to this configuration, the power control can be changed at a high speed since it is not necessary to use interrupt processing, DMA transmission, or the like.

The MCU 100 can realize the power control with high precision at a low cost since many pieces of control content can be realized even with the small number of programs.

Figure 4:
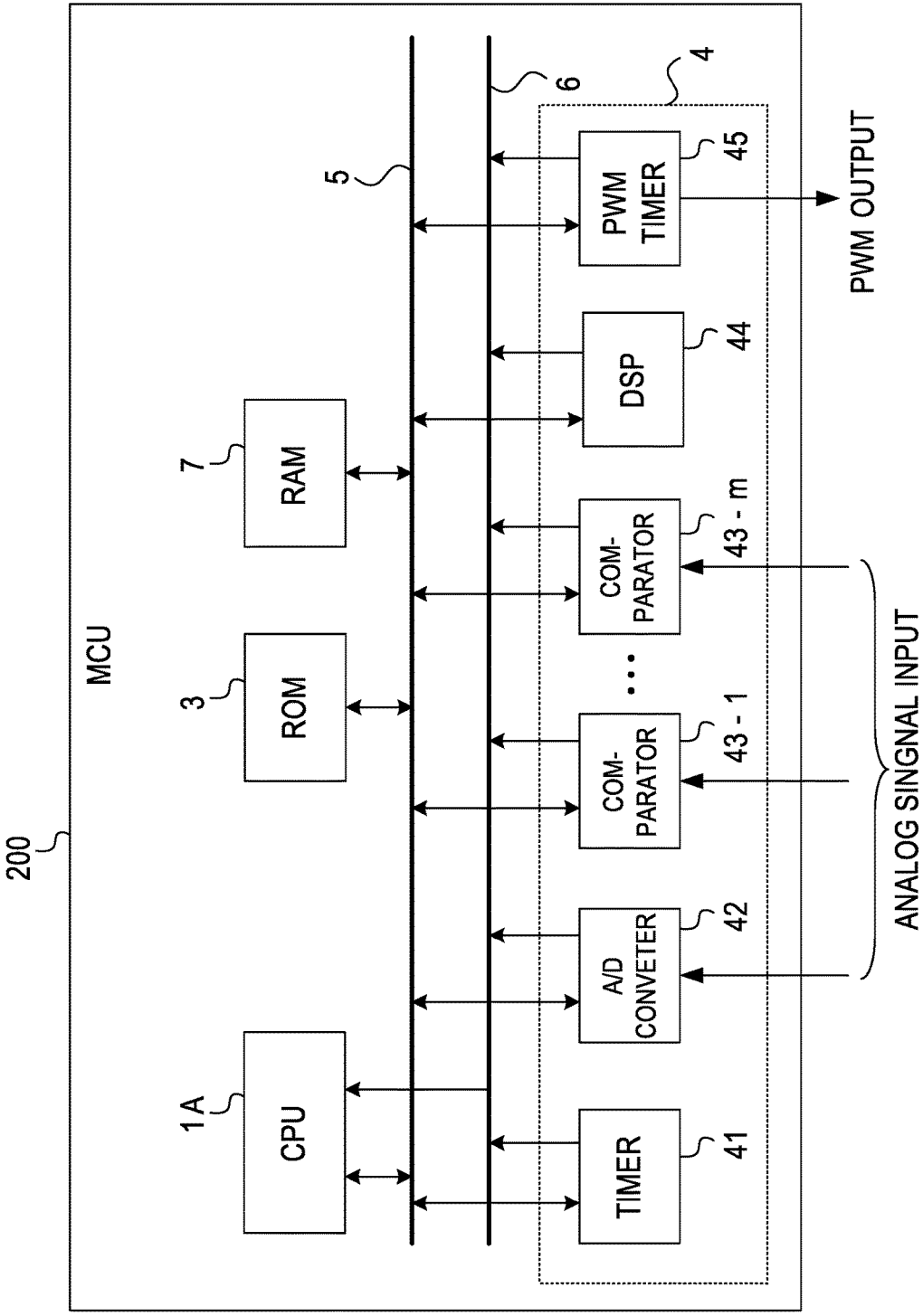
FIG. 4 is a schematic diagram illustrating a schematic configuration of an MCU 200 according to a second embodiment of this disclosure.

FIG. 4 is a schematic diagram illustrating a schematic configuration of an MCU 200 according to a second embodiment of this disclosure.

The MCU 200 illustrated in FIG. 4 has the same configuration as the MCU 100 except that the CPU 1 is changed to a CPU 1A and the data access control unit 2 is omitted.

Figure 5:
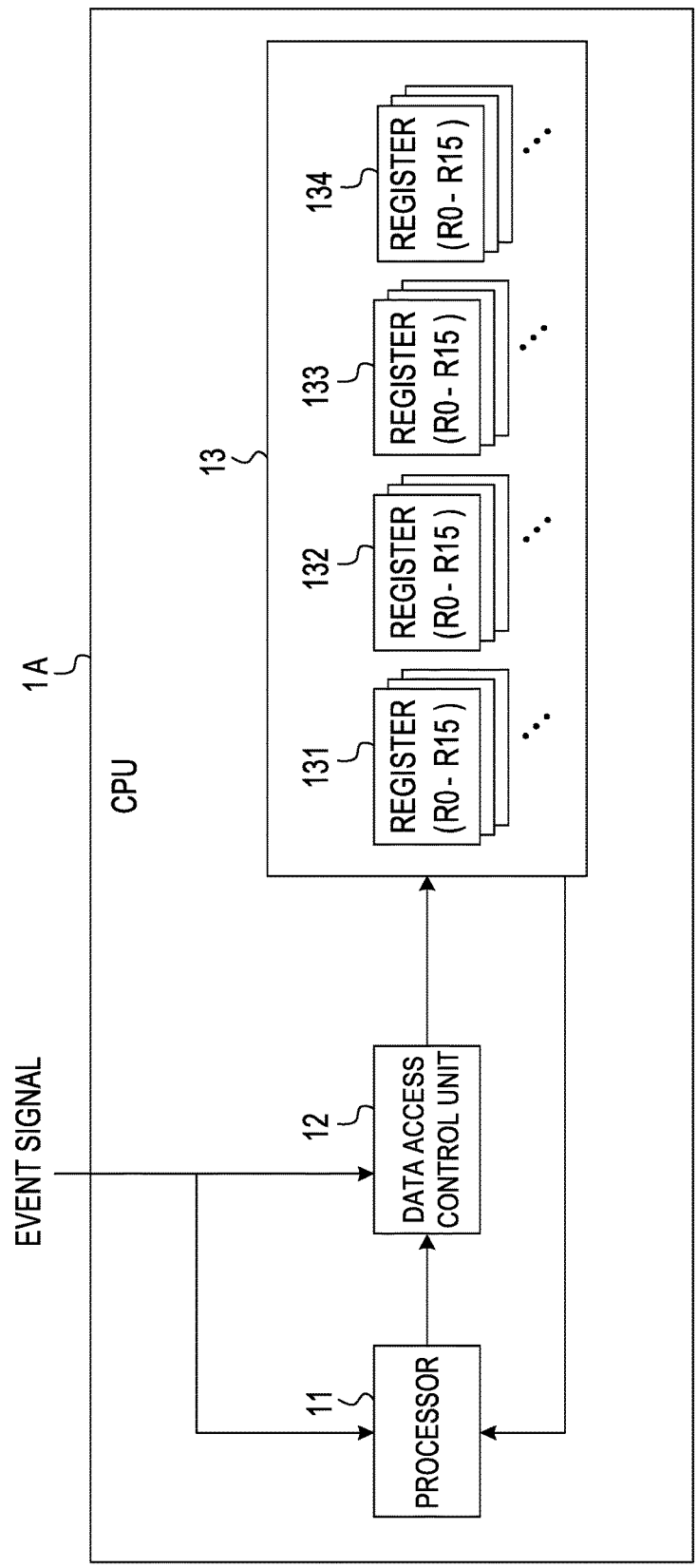
FIG. 5 is a schematic diagram illustrating an internal configuration of a CPU 1A of the MCU 200 illustrated in FIG. 4.

FIG. 5 is a schematic diagram illustrating an internal configuration of the CPU 1A of the MCU 200 illustrated in FIG. 4.

The CPU 1A includes a processor 11 functioning as an arithmetic processing unit, a data access control unit 12, and a memory unit 13 functioning as a data storage unit. They are integrated on one chip.

The processor 11 executes an arithmetic processing by executing a program loaded on the RAM 7 and reads control data necessary for the arithmetic processing from the memory unit 13 to use the control data.

The memory unit 13 includes a register group 131, a register group 132, a register group 133, and a register group 134. The memory unit 13 may include at least one register group.

Each of the register groups 131 to 134 is configured to include a total of sixteen registers, registers R0 to R15.

A register number for identifying the register and a bank number for identifying the register group to which the register belongs are allocated to each of the registers R0 to R15.

Control data which is referred to in an arithmetic processing sequence are loaded from the ROM 3 to be stored in each of the registers included in each of the register groups 131 to 134.

The register number and the bank number allocated to each of the registers of an arbitrary register group serve as information indicating a storage location of the control data stored in this register.

If an instruction to read the control data from the register designated by a first register number and a first bank number (corresponding to a first address) allocated to an arbitrary register in the register group 131 is received from the processor 11, the data access control unit 12 selectively executes: a processing of instructing the memory unit 13 to read the control data from the register designated by the first register number and the first bank number; and a processing of instructing the memory unit 13 to read the control data designated by a register number and a bank number (corresponding to a second address) of a register associated with the first register number and different from the register with the first register number, based on an event signal input from each peripheral circuit of the peripheral circuit unit 4.

Figure 6:
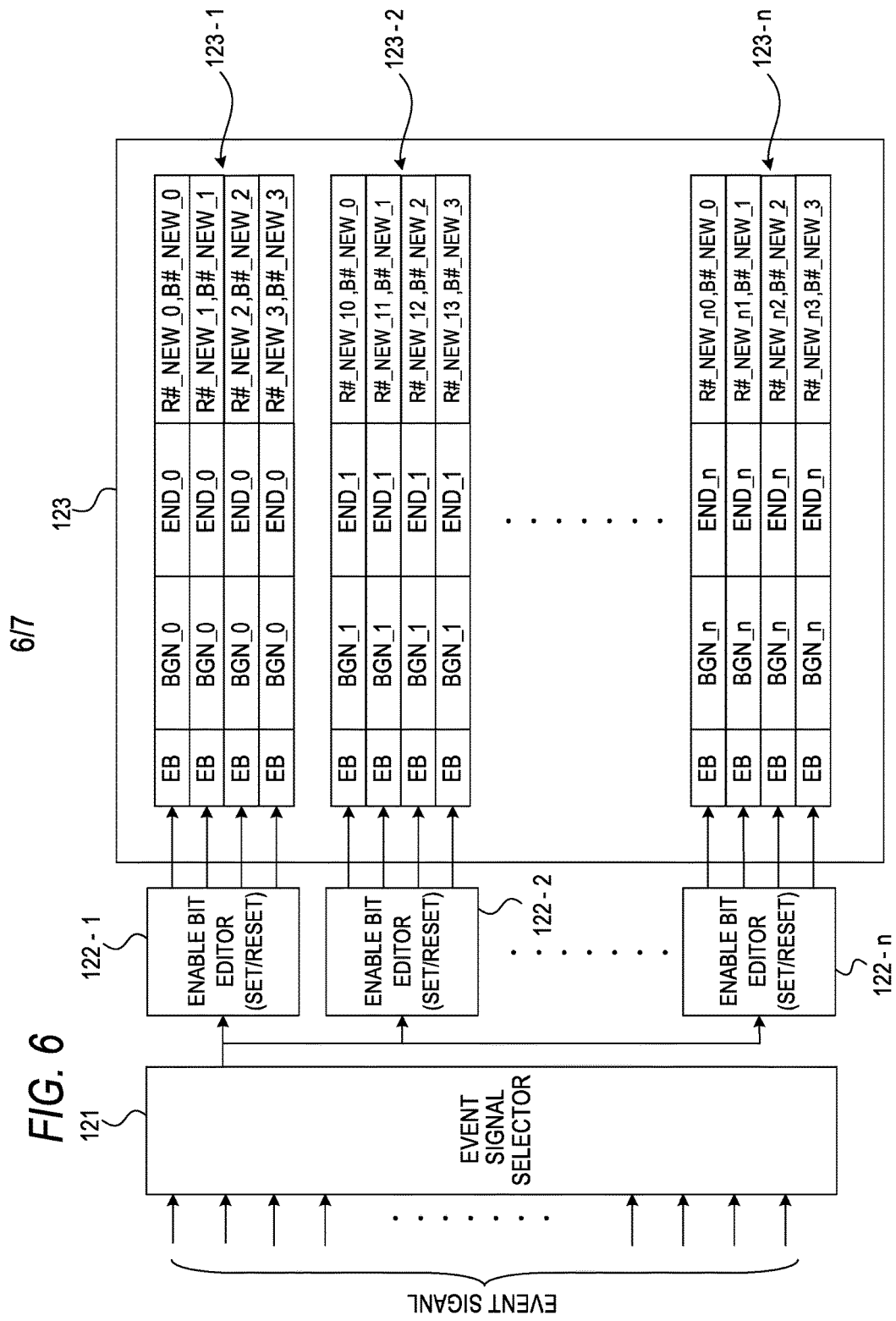
FIG. 6 is a schematic diagram illustrating an internal configuration of a data access control unit 12 of the MCU 200 illustrated in FIG. 4.

FIG. 6 is a schematic diagram illustrating an internal configuration of the data access control unit 12 of the MCU 200 illustrated in FIG. 4.

The data access control unit 12 includes an event signal selector 121, n enable bit editors 122-1 to 122-n (where n is an integer equal to or greater than 2), and a transmission unit 123.

The event signals output from the peripheral circuits are input to the event signal selector 121. The event signal selector 121 selects the event signals which is necessary to change arithmetic processing sequences executed by the processor 11 among the input event signals and inputs the selected event signals to the respective enable bit editors 122-1 to 122-n.

The transmission unit 123 stores at least one data set (in the example of FIG. 6, (4×n) data sets) in which enable bits, group specifying information indicating a range of register numbers of the registers included in an arbitrary group in a case of sixteen registers included in the register group 131 are arranged in a number order and are classified into n groups, and converted access information, which includes register numbers of the registers other than the arbitrary group and bank numbers of the register group to which the registers belong, are associated with each other.

The transmission unit 123 is configured to include a register or a memory such as a ROM storing the data set.

The enable bit included in the data set is denoted by "EB" in FIG. 6. One of information indicating "validity" and information indicating "invalidity" can be written into the enable bit.

The group specifying information included in the data set is denoted by a combination of "BGN_*" and "END_*" (where * corresponds to 0 to n) in FIG. 6.

"BGN_*" included in each data set indicates a minimum value of the register numbers of the registers included in the group, and "END_*" indicates a maximum value of the register numbers of the registers included in the group. The sign "*" is given for convenience to distinguish information and does not mean the above-described register number.

A total data amount of control data stored in all of the registers of the groups indicated by the group specifying information included in each data set is, for example, approximately 1-digit byte equal to or greater than 2 bytes and equal to or less than 4 bytes.

The converted access information included in the data set is denoted by "R#_NEW_@" (where @ corresponds to 0 to 3, 10 to 13, and n0 to n3) and "B#_NEW_@" (where @ corresponds to 0 to 3, 10 to 13, and n0 to n3) in FIG. 6.

"R#_NEW_$" indicates a specific register number and "B#_NEW_$" indicates a specific bank number (where $ corresponds to 0 to 3, 10 to 13, and n0 to n3). The sign "$" is given for convenience to distinguish information and does not mean the above-described register number or bank number.

The transmission unit 123 stores n groups 123-1 to 123-n which respectively include four data sets.

In the four data sets included in each group, the group specifying information is the same and the converted access information is different. The group specifying information of the data set included in each of the groups 123-1 to 123-n all serves information indicating groups which do not overlap.

The enable bit editors 122-1 to 122-n are installed to correspond to the groups 123-1 to 123-n, respectively. That is, the enable bit editor 122-1 corresponds to the group 123-1, the enable bit editor 122-2 corresponds to the group 123-2, . . . , and the enable bit editor 122-n corresponds to the group 123-n.

Each of the enable bit editors 122-1 to 122-n sets or resets the enable bits included in four data sets of the corresponding group based on the event signals input from the event signal selector 121.

In the enable bit editors 122-1 to 122-n, it is possible to arbitrarily set information indicating the data set, in which the enable bits are set or reset, in response to input a certain event signal.

In a state where an instruction to read the control data designated by the first register numbers and the first bank numbers allocated to the registers belonging to the register group 131 is received from the processor 11, if there is a data set in which the enable bits are set to be valid (hereinafter also referred to as valid data bits) and the first register number is included in the range of the register numbers of the group designated by the group specifying information included in the valid data set, the transmission unit 123 outputs the converted access information included in the valid data set to the memory unit 13 and executes a processing of instructing the memory unit 13 to read the control data designated by the converted access information.

In a state where the instruction to read the control data designated by the first register number and the first bank number is received from the processor 11, if there is no valid data set, the transmission unit 123 outputs the first register number and the first bank number to the memory unit 13 without converting and executes a processing of instructing the memory unit 13 to read the control data designated by the first register number and the first bank number.

In a state where the instruction to read the control data designated by the first register number and the first bank number is received from the processor 11, if there is a valid data set and the first register number is not included in the range of the register numbers of the group designated by the group specifying information included in the valid data set, the transmission unit 123 outputs the first register number and the first bank number to the memory unit 13 without converting and executes a processing of instructing the memory unit 13 to read the control data designated by the first register number and the first bank number.

In the data access control unit 12, a function other than a storage element storing the data set may be realized by either hardware or software.

Figure 7:
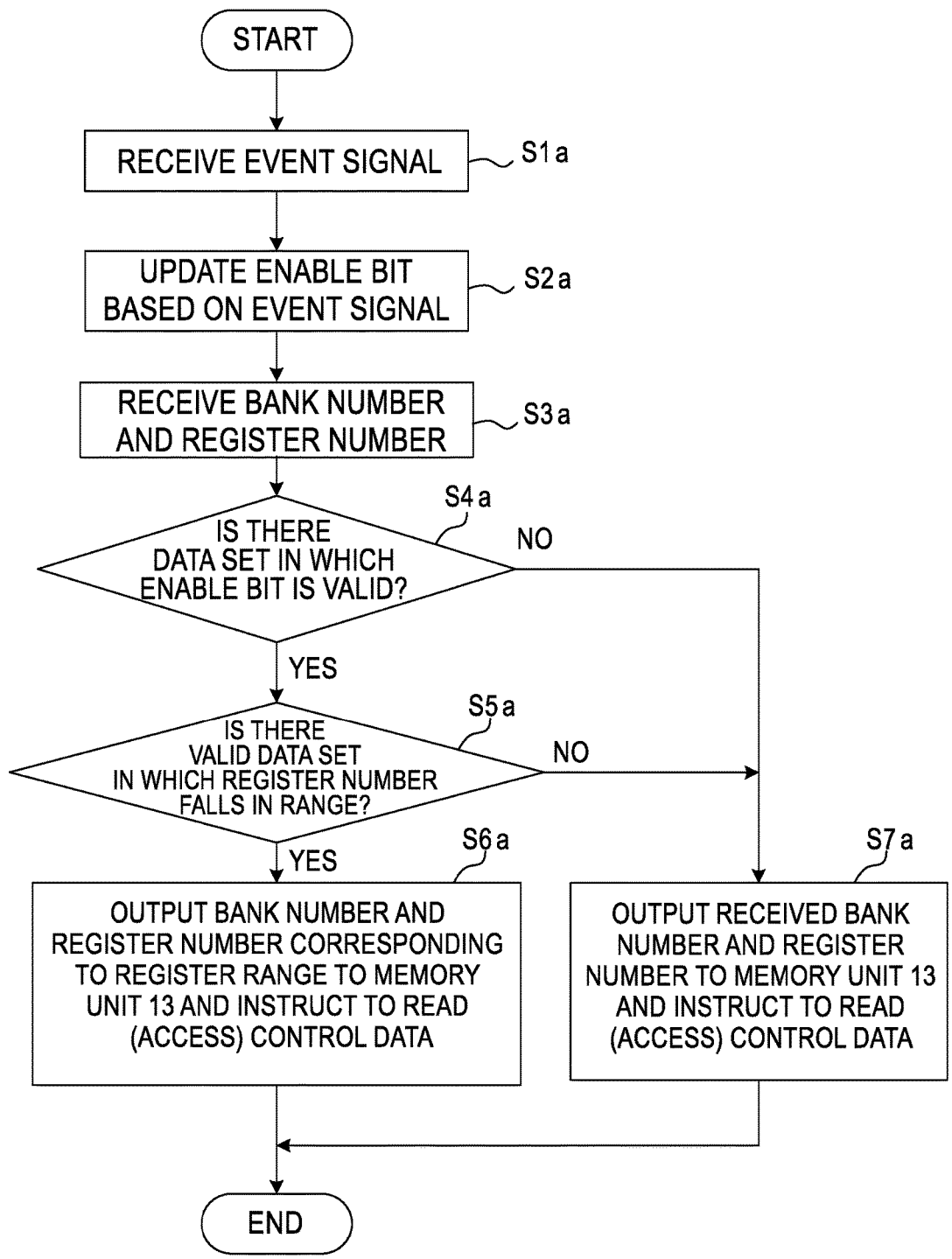
FIG. 7 is a flowchart illustrating an operation of the data access control unit 12 of the MCU 200 illustrated in FIG. 4.

FIG. 7 is a flowchart illustrating an operation of the data access control unit 12 of the MCU 200 illustrated in FIG. 4.

When an event signal is output from the peripheral circuit in the MCU 200, the event signal is input to the processor 11 and the data access control unit 12.

When the processor 11 receives the event signal, in order to start executing this arithmetic processing sequence, the processor 11 transmits the first register number of the register storing the control data used in another arithmetic processing sequence to the data access control unit 12.

When the data access control unit 12 receives the event signal (step S1a), the data access control unit 12 sets the enable bit in the necessary data set among all of the data sets based on the event signal and maintains the enable bit in a reset state in the other data sets (step S2a).

After step S2a, the data access control unit 12 receives the first register number and the first bank number from the processor 11 (step S3a) and determines whether there is the valid data set in which the enable bit is valid (step S4a).

When there is the valid data set (YES in step S4a), the data access control unit 12 compares the range of the register numbers of the group designated by the group specifying information included in the valid data set to the first register number received in step S3a and determines whether there is the valid data set in which the first register number falls in the range (step S5a).

When there is the valid data set in which the first register number falls in the range (YES in step S5a), the data access control unit 12 transmits the converted access information included in the valid data set to the memory unit 13 and instructs the memory unit 13 to read the control data designated by the converted access information (step S6a).

When there are the plurality of valid data sets in which the first register number falls in the range, the data access control unit 12 determines priority decided in advance for the plurality of valid data sets and executes the processing of step S6a in sequence from the valid data set with higher priority.

According to the processing of step S6a, the processor 11 can read the control data stored in the different register from the register with the first register number while executing the processing of designating the first register number of an arbitrary register of the register group 131, and thus can execute the arithmetic processing using the control data.

When there is no valid data set (NO in step S4a) or when there is the valid data set but there is no valid data set in which the first register number falls in the range (NO in step S5a), the data access control unit 12 transmits the first register number and the first bank number received from the processor 11 to the memory unit 13 and instructs the memory unit 13 to read the control data designated by the first register number and the first bank number (step S7a).

As described above, in the MCU 200, the processor 11 can refer to another control data in accordance with an occurrence situation of the event signal without converting the storage location (at least one of the bank number and the register number) of the control data of the memory unit 13 designated by the processor 11. In this configuration, the power control can be changed at a high speed since it is not necessary to use interrupt processing, DMA transmission, or the like.

The MCU 200 can realize the power control with high precision at a low cost since many pieces of control content can be realized even with the small number of programs.

The MCU 100 and the MCU 200 execute the power control by controlling a switching element in a switching power device. For example, the present disclosure can also be similarly applied to a micro controller unit that controls, for example, an alternator-regulator switching element.

The MCU 100 and the MCU 200 may include a dedicated event output processor that outputs an event signal according to an operation state of another peripheral circuit or an operation state of a CPU or a DSP as a peripheral circuit.

For example, the event output processor outputs an event signal to the event bus 6 based on an event signal output from some of the above-described peripheral circuits. Specifically, the event output processor outputs an event signal when it is determined that an event signal is repeatedly output from the comparator.

The event output processor may monitor a progress of an arithmetic processing in an arithmetic processing sequence executed by the CPU 1 or the CPU 1A and may output an event signal to the event bus 6 when a progress situation satisfies a predetermined condition.

The cases in which the CPU 1 and the CPU 1A read the control data have been described above. However, the present disclosure can also be applied to a case in which the DSP 44 executes a program and reads control data used for an arithmetic processing based on the program from a register group in the ROM 3 or the DSP 44. In this case, the DSP 44 functions as an arithmetic processing unit.

The specific embodiment of the present disclosure has been described above, but the embodiment is merely an example and can, of course, be modified in the scope of the present disclosure without departing from the gist of the present disclosure. For example, in the above description, a case where reading address is converted and reading from the data storage unit is performed is described. However, this disclosure is not limited thereto. That is, writing address can be converted and writing to the data storage unit can be performed.

As described above, the following factors are disclosed in the present specification.

According to this disclosure, a micro controller unit capable of controlling a power conversion device includes: an arithmetic processing unit that executes an arithmetic processing based on a program; a data storage unit that stores data used in the arithmetic processing; a peripheral circuit unit that outputs an event signal, which is a trigger for start of the arithmetic processing by the arithmetic processing unit, based on an operation state; and a data access control unit, wherein, when an instruction to access the data designated by a first address is received from the arithmetic processing unit, the data access control unit selectively executes, depending on the event signal input from the peripheral circuit unit: a processing of instructing the data storage unit to access data designated by the first address indicating a storage location of the data on the data storage unit; and a processing of processing of converting the first address and instructing the data storage unit to access data designated by a second address, which is associated with the first address and is different from the first address.

In the above-described micro controller unit, the data access control unit may stores at least one of data sets in which range information indicating a range of storage locations of data on the data storage unit and an address indicating a storage location out of the range are associated, and wherein the data access control unit sets the data set to be valid or invalid based on the event signal, wherein if there is the data set which is set to be valid and the first address is included in a range based on the range information included in the data set which is set to be valid, the data access control unit executes the processing of processing of converting the first address and instructing the data storage unit to access data designated by the second address by using the address included in the data set as the second address.

In the above-described micro controller unit, a capacity of the data in the range indicated by the range information included in the data set may be equal to or greater than 2 bytes and equal to or less than 4 bytes.

In the above-described micro controller unit, the data storage unit may be configured by a memory, which is provided outside a chip including the arithmetic processing unit and is connected to the arithmetic processing unit via a bus.

In the above-described micro controller unit, the data storage unit may be configured by a register, which provided inside a chip including the arithmetic processing unit.

In the above-described micro controller unit, the peripheral circuit unit may include a comparator, and the comparator may output the event signal based on a comparison result of a plurality of input signals.

In the above-described micro controller unit, the peripheral circuit unit may include an event output processor that outputs the event signal based on event signals output from other circuit of the peripheral circuit unit.

What is claimed is:

1. A micro controller unit capable of controlling a power conversion device, comprising:
   an arithmetic processing unit that executes an arithmetic processing based on a program;
   a data storage unit that stores data used in the arithmetic processing;
   a peripheral circuit unit that outputs an event signal, which is a trigger for start of the arithmetic processing by the arithmetic processing unit, based on an operation state; and
   a data access control unit,
   wherein, when an instruction to access the data designated by a first address is received from the arithmetic processing unit, the data access control unit selectively executes, depending on the event signal input from the peripheral circuit unit:
      a processing of instructing the data storage unit to access the data designated by the first address indicating a storage location of the data on the data storage unit; and
      a processing of converting the first address and instructing the data storage unit to access data designated by a second address, which is associated with the first address and is different from the first address.

2. The micro controller unit according to claim 1,
   wherein the data access control unit stores at least one data set in which range information indicating a range of storage locations of data on the data storage unit and an address indicating a storage location out of the range are associated, and
   wherein the data access control unit sets the at least one data set to be valid or invalid based on the event signal,
   wherein if there is a data set of the at least one data set which is set to be valid and the first address is included in a range based on the range information included in the data set which is set to be valid, the data access control unit executes the processing of converting the first address and instructing the data storage unit to access the data designated by the second address by using the address included in the data set as the second address.

3. The micro controller unit according to claim 2,
   wherein a capacity of the data in the range indicated by the range information included in the data set is equal to or greater than 2 bytes and equal to or less than 4 bytes.

4. The micro controller unit according to claim 1,
   wherein the data storage unit is configured by a memory, which is provided outside a chip including the arithmetic processing unit and is connected to the arithmetic processing unit via a bus.

5. The micro controller unit according to claim 1,
   wherein the data storage unit is configured by a register, which is provided inside a chip including the arithmetic processing unit.

6. The micro controller unit according to claim 1,
   wherein the peripheral circuit unit includes a comparator, and
   wherein the comparator outputs the event signal based on a comparison result of a plurality of input signals.

7. The micro controller unit according to claim 1,
   wherein the peripheral circuit unit includes an event output processor that outputs the event signal based on event signals output from another circuit of the peripheral circuit unit.

* * * * *